United States Patent Office 3,414,571
Patented Dec. 3, 1968

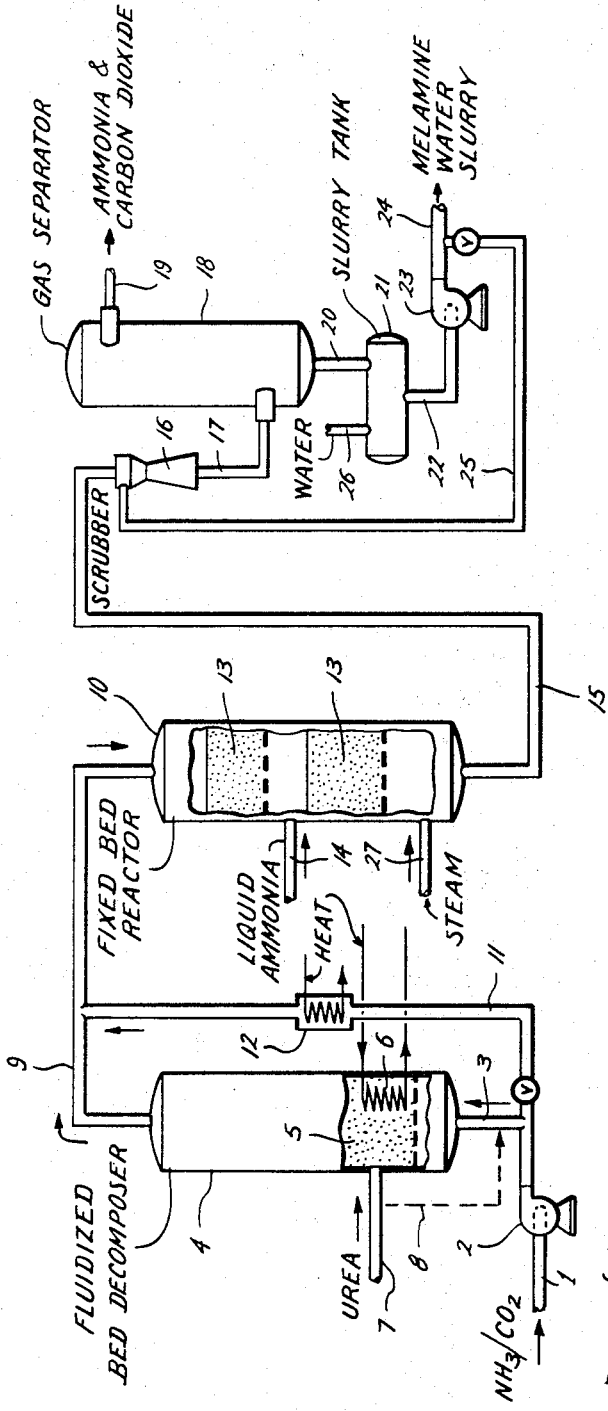

3,414,571
PROCESS FOR PRODUCTION OF MELAMINE
FROM UREA
Harry W. Haines, Jr., and Sam P. Robinson, Houston,
Tex., assignors to Melamine Research Corporation,
Washington, D.C., a corporation of Maryland
Filed Sept. 16, 1966, Ser. No. 579,922
19 Claims. (Cl. 260—249.7)

ABSTRACT OF THE DISCLOSURE

An improved process for the production of melamine from urea, employing a two-stage process, in which the urea is thermally decomposed in a first-stage fluidized bed in the presence of ammonia, and the decomposition products converted in the second stage in the presence of specific crystalline zeolite catalysts, the reaction temperature in the second stage being controlled by a liquid ammonia quench.

---

This invention relates to the preparation of melamine from urea and/or its thermal decomposition products.

In general, melamine is produced by catalytically decarboxylating the thermal decomposition products of urea in the presence of ammonia.

Among the more efficient processes now known are two-stage processes in which decomposition of the urea is effected by subjecting it to thermal decomposition conditions in the presence of gaseous ammonia in a fluidized bed of particulate material, which is non-catalytic or inert to decarboxylation of the decomposition products. Usually, the gaseous ammonia is used as the fluidizing gas. The resulting vaporized decomposition products and ammonia are then subjected to contact with a suitable catalyst, generally in a fixed bed which is effective to convert components of the gaseous mixture to melamine, which is then condensed in a water wash to produce a solid product for subsequent separation and recovery.

A primary object of the present invention is to provide improvements in such two-stage processes whereby to increase the efficiency thereof and the yields and quality of the product melamine.

A more specific object is the provision of a novel catalyst for use in the second stage of the process.

A further object is the employment as said novel catalyst for use in the second stage of the process of a natural or artificial crystalline zeolite having an effective pore diameter of 8 to 15 Angstroms and a particle diameter in the range from about 1.5 to about 6.0 mm.

Another important object is the improvement comprising employment of liquid ammonia as a part of the ammonia employed in the second stage of the process to function as a liquid quench for the reactants to more accurately control the temperature thereof.

A further object is the improvement comprising the step of introduction of steam into the products of reaction from the second stage to more efficiently hydrolyze the unreacted urea and straight-chain intermediates present in the products of reaction and thereby produce a final melamine product of a high degree of purity.

Still another object is the employment of gaseous ammonia and/or carbon dioxide as the fluidizing gas in the first stage of the process.

Other and more specific objects and advantages of this invention will become more readily apparent from the following detailed description when read in conjunction with the accompanying flow sheet illustrating a preferred embodiment of the process.

Referring to the flow sheet, gaseous ammonia or carbon dioxide or mixtures of these gases are introduced through a line 1 and are blown, by means of a compressor 2, through a line 3 into the bottom of a decomposer vessel 4 which contains a fluidized bed 5 of particulate material which is non-catalytic or inert, insofar as causing decarboxylation of urea and its decomposition products under the conditions in the decomposer vessel. This particulate material may be sand, glass beads, spent petroleum cracking catalysts, or the like, which may be heated in any suitable manner as by means of a heating coil 6 immersed in the fluidized material and adapted to maintain therein a urea-decomposing temperature. The gaseous material entering vessel 4 will be introduced at volumes and rates sufficient to maintain bed 5 in an effectively fluidized state so as to assure maximum heat transfer with respect to the urea which is introduced into bed 5. The urea may be sprayed into bed 5 through a line 7 as a liquid or alternatively, through a line 8 as a powdered solid injected into the gaseous stream entering vessel 4 through line 3.

A temperature in the range from about 300° to about 450° C. is maintained in bed 5 to effectively decompose the urea to its various known decomposition products. These are discharged in admixture with the added gaseous ammonia or carbon dioxide through a line 9 into a reactor vessel 10. To more effectively control the temperature of the products entering reactor 10, a portion of the fluidizing gas may be by-passed around vessel 4 through a line 11 directly into line 9. A heat exchanger 12 may be disposed in by-pass line 11 to heat the by-passed gaseous fluid to a suitable temperature effective to maintain the products flowing to reactor 10 in the desired temperature range.

Reactor 10 has disposed therein a plurality of fixed beds of catalyst 13, to be more fully described hereinafter, through which the hot mixed gaseous materials from line 9 will pass and in which these gaseous materials are subjected to reaction in the presence of the ammonia contained in the entering gaseous materials to produce melamine. An added quantity of ammonia in the form of liquid ammonia is introduced at a suitable point in the reactor, as through a line 14, in an amount sufficient to act as a liquid quench to control the exothermic reaction which occurs in the reactor in the production of melamine.

The melamine produced in reactor 10, together with any unreacted urea and straight-chain intermediates, along with the excess ammonia and carbon dioxide will be discharged as a gaseous product through a line 15 from the bottom of reactor 10 to a suitable scrubber, such as a conventional venturi slurry scrubber 16, where the hot reaction products are scrubbed with water to condense the melamine and to hydrolyze any unreacted urea and straight-chain reaction products.

To asure a melamine product of maximum purity, we have found it highly useful to introduce steam into reactor 10, as through a line 27, into admixture with the reaction products leaving the final catalyst bed, to thereby effect hydrolysis of any unreacted urea and straight-chain intermediates to their gaseous components, largely ammonia and carbon dioxide, before they reach the condensing stage such as occurs in scrubber 16. This reduces the occlusion of such unreacted urea and intermediates as impurities in the condensed melamine.

The materials leaving scrubber 16 through a line 17 are introduced into a gas separator 18 wherein gaseous ammonia, carbon dioxide and water vapor will be separated from a water slurry of the final melamine product. The gaseous materials will be discharged from separator 18 through a line 19 while the melamine-water slurry will discharge from the bottom of separator 18 through a line 20 into slurry tank 21. From the latter, the slurry will be drawn through a line 22 by a pump 23 which discharges a portion of the melamine-water slurry through a line 24 to a suitable separating apparatus, not shown but of wellknown construction, for recovery of the product melamine. A portion of the melamine-water slurry will be pumped through a line 25 to scrubber 16 for effecting the initial condensation of the product melamine. Make-up water, to replace that lost through carry-over with the ammonia and carbon dioxide and to the final separating stage, will be added in slurry tank 21 through a line 26.

Pressures throughout the processing system are preferably atmospheric or only slightly above atmospheric.

As noted previously, the fluidizing gases employed in the first stage of the process may be ammonia, carbon dioxide or mixtures thereof. In general, a molal ratio of ammonia and/or carbon dioxide to urea entering the pyrolysis stage is maintained within the limits of 2.5 to 10.0. Where a mixture of ammonia and carbon dioxide is employed, the proportions of ammonia to carbon dioxide in such mixture may be in any desired ratio.

The particulate material employed in the fluidized bed first stage is, as noted, a material which is catalytically inert to the pyrolysis products, being selected primarily for its efficiency as a heat-transfer medium and may consist of materials such as sand, glass beads, spent petroleum cracking catalyst, and the like, having a particle size ranging from about 20 microns to about 20 mesh, and a surface area ranging from 1.0 to 800 square meters per gram, and preferably having a relatively high thermal conductivity, e.g., above 0.10 B.t.u. per foot, per hour, per degree Fahrenheit.

The catalyst employed in the second or reactor stage is a natural or artificial crystalline zeolite, commonly known as molecular sieves, having an effective pore diameter in the range from 8 to 15 Angstroms. These catalysts are employed in particulate form in particle sizes ranging from about 1.5 to 6.0 mm. in diameter; having internal areas in the range from about 500 to 800 m.$^2$/g.; and pore volumes in the range from about 35 to 45 cc./g.

In the reactor stage, the molal ratio of ammonia to urea in the initial feed is maintained within the range from about 4.0 to about 12.0 by the addition of liquid ammonia. This added ammonia acts as a quench effective to control the reaction temperature within optimum limits for maximum melamine production.

The steam injected into the reaction zone in introduced into the exit from the catalyst bed. The steam temperature and quantity will be varied in accordance with the temperature and composition of the product stream leaving the catalyst beds.

By-passing of a portion of the fluidizing gas around the decomposer is found to be particularly advantageous, in that it provides accurate control of the temperature at the inlet of the second-stage reactor and a greater range of ammonia-urea ratios. In this connection it may be noted that the gas flow is restricted to the range of fluidization velocities compatible with the particle size in the urea decomposer. The urea flow, in turn, is limited by the maximum heat transfer obtained through the heating coils or tubes. These factors in combination set the maximum and minimum ammonia-urea ratios in the system.

A heated gas by-pass, as herein disclosed, extends the operating range which otherwise can only be altered by changing the particle size in the fluidized bed. Furthermore, as indicated previously, the inlet temperature of the fixed bed reactor can be maintained above or below the exit temperature of the urea decomposer, as may be required, by regulating the volume and temperature of the by-pass gas.

It will be understood that various modifications and alterations may be made in the process heretofore disclosed within the scope of the appended claims but without departing from the spirit of this invention.

What we claim and desire to secure by Letters Patent is:

1. In the process for the conversion of urea to melamine wherein gaseous pyrolitic decomposition products of urea are heated at a temperature in the range of from about 300° C. to about 450° C. at substantially atmospheric pressure in the presence of ammonia and a catalyst material effective to convert said products to melamine, the improvement wherein at least a portion of said ammonia is in the form of liquid ammonia which is injected into the stream of said gaseous products undergoing reaction in the presence of said catalyst material as a quench fluid to control said temperature.

2. In the process according to claim 1, the further improvement wherein steam is injected into the products of said reaction, whereby to promote hydrolysis of undecomposed urea and straight-chain intermediates produced in the process.

3. The process according to claim 1 wherein said catalyst material is a member selected from the class consisting of natural and artificial crystalline zeolites having an effective pore diameter in the range from 8 to 15 Angstroms.

4. The process according to claim 2 wherein said catalyst material is a member selected from the class consisting of natural and artificial crystalline zeolites having an effective pore diameter in the range from 8 to 15 Angstroms.

5. The process according to claim 1 wherein said catalyst material is a member selected from the class consisting of natural and artificial crystalline zeolites having an effective pore diameter in the range from 8 to 15 Angstroms, and is of particulate form having particle diameters in the range from about 1.5 to about 6.0 mm.

6. The process according to claim 1 wherein the molal ratio of ammonia to urea (initial feed) maintained in said gaseous products undergoing reaction is in the range from about 4.0 to about 12.0.

7. The process for the conversion of urea to melamine which comprises passing gaseous pyrolytic products of urea in admixture with ammonia at substantially atmospheric pressure and at a temperature in the range from about 300° C. to about 450° C. into contact with a fixed bed of a particulate catalyst consisting of a member selected from the class consisting of natural and artificial crystalline zeolites having an effective pore diameter in the range from 8 to 15 Angstroms.

8. A process for converting urea to melamine, comprising,
    (a) vaporizing and decomposing urea in a fluidized bed of a particulate material non-catalytic to decarboxylation of the urea pyrolysis products
        (i) in the presence of a fluidizing gas selected from the group consisting of ammonia, carbon dioxide, and mixtures thereof,
        (ii) at a temperature in the range from about 300° to about 450° C.,
    (b) thereafter passing the urea pyrolysis products and fluidizing gas together with added ammonia over a fixed bed of a catalyst effective to convert said products to melamine maintained at a temperature in said range,
        (i) said catalyst being a member selected from the class consisting of natural and artificial crystalline zeolites having an effective pore diameter in the range from 8 to 15 Angstroms, and
    (c) recovering melamine from the product gases.

9. The process according to claim 8 wherein at least a portion of said added ammonia is in the form of liquid ammonia injected into the stream of materials undergoing reaction in said fixed bed of catalyst as a quench fluid to control said temperature.

10. The process according to claim 8 wherein steam is injected into the products of reaction from said fixed bed of catalyst whereby to promote hydrolysis of undecomposed urea and straight-chain intermediates produced in the process.

11. In the process according to claim 8 the step of controlling the temperature of the pyrolysis products going to said catalyst by admixing therewith a portion of said fluidizing gas heated to a pre-determined temperature and by-passed around said bed of particulate material.

12. The process according to claim 9 wherein steam is injected into the products of reaction from said fixed bed of catalyst whereby to promote hydrolysis of undecomposed urea and straight-chain intermediates produced in said process.

13. The process according to claim 8 wherein said catalyst is further characterized as of particulate form having particle diameters in the range from about 1.5 to about 6.0 mm.

14. The process according to claim 8 wherein the molal ratio of ammonia to urea (initial feed) maintained in contact with said catalyst is in the range from about 4.0 to about 12.0.

15. A process for converting urea to melamine, comprising,
  (a) vaporizing and decomposing urea in a fluidized bed of a particulate material non-catalytic to decarboxylation of the urea pyrolysis products
    (i) in the presence of a fluidizing gas selected from the group consisting of ammonia, carbon dioxide, and mixtures thereof,
    (ii) at a temperature in the range from about 300° to about 450° C.,
  (b) thereafter passing the urea pyrolysis products and fluidizing gas together with added ammonia over a fixed bed of a catalyst effective to convert said products to melamine maintained at a temperature in said range and at substantially atmospheric pressure,
    (i) at least a portion of said added ammonia being in the form of liquid ammonia injected into the stream of materials undergoing reaction in said fixed bed of catalyst as a quench fluid to control said temperature, and
  (c) recovering melamine from the product gases.

16. In the process according to claim 15, the step of controlling the temperature of the pyrolysis products going to said catalyst by admixing therewith a portion of said fluidizing gas heated to a pre-determined temperature and by-passed around said bed of particulate material.

17. In the process according to claim 16, the further step of injecting steam into the products of reaction from said fixed bed of catalyst whereby to promote hydrolysis of undecomposed urea and straight-chain intermediates produced in said process.

18. The process according to claim 15 wherein the molal ratio of said fluidizing gas to urea is in the range from 2.5 to 10.0.

19. The process according to claim 15 wherein the molal ratio of ammonia to urea (initial feed) maintained in contact with said fixed bed of catalyst is in the range from about 4.0 to about 12.0.

References Cited

UNITED STATES PATENTS

| 2,191,361 | 2/1940 | Widner et al. | 260—249.7 |
| 3,095,416 | 6/1963 | Crowley et al. | 260—249.7 |
| 3,316,265 | 4/1967 | Ringleman et al. | 260—249.7 |
| 3,328,401 | 6/1967 | Martin | 260—249.7 |

HENRY R. JILES, *Primary Examiner.*

J. M. FORD, *Assistant Examiner.*